June 26, 1934. R. INSLEY ET AL 1,964,061
ENGINE
Filed Aug. 5, 1929
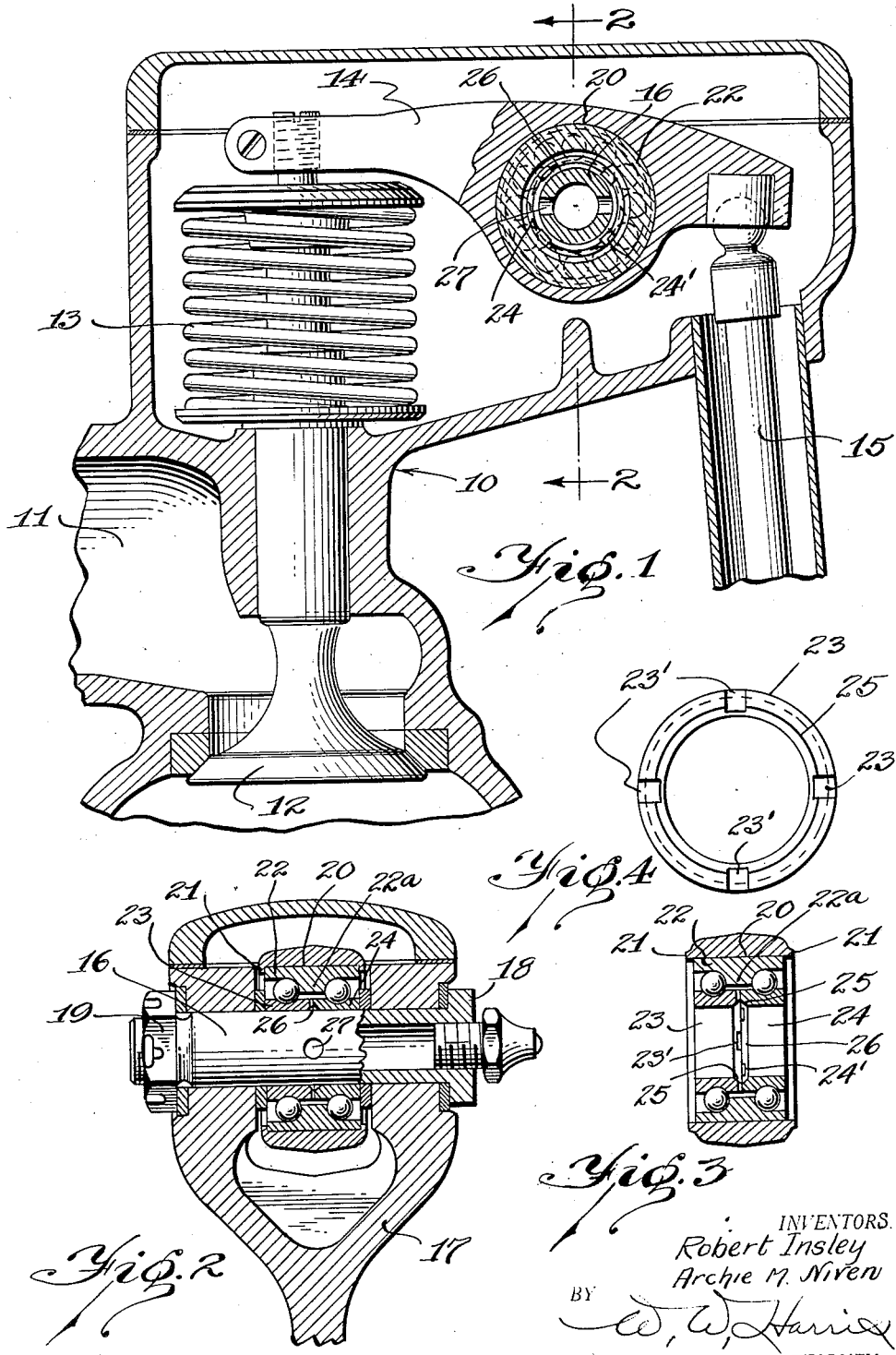

Patented June 26, 1934

1,964,061

UNITED STATES PATENT OFFICE 1,964,061

ENGINE

Robert Insley and Archie M. Niven, Detroit, Mich., assignors, by mesne assignments, to Continental Aircraft Engine Company, a corporation of Delaware Application August 5, 1929, Serial No. 383,436

7 Claims. (Cl. 308—187)

This invention relates to internal combustion engines, and is particularly related to an improved valve operating mechanism of the type especially adapted for use in aircraft engines and the like.

An object of the present invention is to decrease the manufacturing and assembly costs for internal combustion engines of this type, by providing a valve rocker arm construction, that may be readily and accurately machined and then subsequently assembled to a member such as a bearing assembly or the like.

A further object of the invention is to provide a better and more efficient assembly of a nonfriction bearing with a valve rocker arm for internal combustion engines, by providing a rocker arm construction, in which a bearing structure or assembly can be accurately fitted and located and then positively fixed in such position.

For a more detailed understanding of the invention, reference may be had to the accompanying drawing, which illustrates one form which the invention may assume, and in which:

Fig. 1 is a sectional view of the improved valve actuating device,

Fig. 2 is a sectional view taken substantially on the line 2—2 of Fig. 1,

Fig. 3 is a sectional view of the rocker arm and bearing structure or assembly prior to locking the bearing assembly to the rocker arm, and Fig. 4 is a detail view in elevation on an enlarged scale of one of the inner bearing rings of the ball bearing assembly.

The drawing illustrates a standard form of engine design, showing a fragmentary portion of an engine, designated by the reference character 10, which is provided with the usual gas conduit 11 controlled by a valve 12 adapted to be unseated against the pressure of the spring 13 by the rocker arm or member 14 and push rod 15. The illustrated embodiment of our invention shows a rocker arm 14 pivotally supported intermediate its ends by a hollow pin 16 mounted in the supports 17, the pin held fixed by the flanged end 18 and nut 19.

The rocker arm or first member 14 is provided with a cylindrical transverse opening 20 intermediate its ends, and with the deformable annular fins or flanges 21 projecting longitudinally from around the peripheral edge at one or both ends of the opening 20. It will be observed by viewing Fig. 3, that the opening 20 of the illustrated structure may be machined straight through prior to the assembly of the ball bearing structure or assembly or other cooperating element therewith.

An outer ring or second member 22 of the ball bearing structure is arranged to just fit in the opening 20, the fins or flanges 21 extending beyond the ends of the outer ring 22. In the illustrated embodiment of our invention the outer ring is provided with an inwardly extending annular rib 22—a intermediate its ends, which provides spaced ball races serving to support the separate multiple ball assemblies of the ball bearing structure. The inner ring of the ball bearing structure, encircling the hollow pin 16, comprises the separate contacting complementary rings 23 and 24, the contacting faces thereof being provided with one or more radial lubricant conducting grooves 23' and 24'. These rings 23 and 24 are each provided with inner ball races for supporting the ball assemblies. The inner edge of the contacting faces of the inner rings are chamfered, as at 25, to provide an annular groove 26 around the inside of the rings. Lubricant is preferably forced into the hollow pin 16, from whence it is fed through the ports 27 in the wall of the pin into the annular groove 26, and thence through the radial or outwardly extending lubricant conducting grooves 23' and 24' into the interior of the ball bearing structure or assembly.

The outer bearing ring or second member 22 carrying the central inwardly extending annular rib 22—a is secured in the cylindrical opening 20 of the rocker arm or first member 14, by peening over the fins or flanges 21, preferably carried by the said first member, over the ends of the said second member 22.

It will thus be observed, that the second member such as the outer ring of the bearing structure or assembly is securely fixed or locked within the first member such as the rocker arm, and very accurately positioned therein, thereby accurately locating the inner bearing rings and aligning the lubricant passages in the contacting faces thereof with the ports 27 in the pin 16.

It will also be noted, that the opening in the rocker arm may be very readily machined prior to the assembly with the ball bearing structure or assembly, thus insuring an accurate fit, and the accurate positioning of the ball bearing structure therein.

Although but one form of the invention has been illustrated and but a single application thereof has been described in detail, it will be apparent to those skilled in the art to which the invention pertains, that the various modifications and changes may be made therein without departing from the spirit of the invention or from the scope of the appended claims.

What we claim as our invention is:

1. A rocker arm provided with a cylindrical opening intermediate its ends and a rocker support and a pin carried by the support, and a bearing structure surrounding the pin within said opening for journalling the rocker arm on said pin and having separate spaced ball assemblies, said bearing structure including separate contacting inner ball bearing rings each having a ball race, the contacting faces of said inner ball bearing rings each provided with one or more radial lubricant conducting grooves.

2. A rocker arm provided with a cylindrical opening intermediate its ends and a rocker support and a pin carried by the support, and a bearing structure surrounding the pin within said opening for journalling the rocker arm on said pin and having separate spaced ball assemblies, said bearing structure including separate contacting inner ball bearing rings each having a ball race and surrounding said pin, the inner rim of the contacting faces of said inner ball bearing rings being chamfered to provide an annular groove encircling said pin and each contacting face provided with one or more radial lubricant conducting grooves communicating with said annular groove.

3. A rocker arm provided with a cylindrical opening intermediate its ends, a rocker support and a pin carried by the support, and a bearing structure surrounding said pin within said opening for journalling the rocker arm on said pin and having separate spaced ball assemblies, said bearing structure including separate contacting inner ball bearing rings each having a ball race, the contacting faces of said inner ball bearing rings each provided with one or more outwardly extending lubricant conducting grooves.

4. A rocker arm provided with a cylindrical opening intermediate its ends, a rocker support and a pin carried by the support, and a bearing structure surrounding said pin within said opening for journalling the rocker arm on said pin and having separate spaced ball assemblies, said bearing structure including separate contacting inner ball bearing rings each having a ball race, one of said inner ball bearing rings having one or more outwardly extending lubricant conducting grooves in the face contacting with said other inner ball bearing ring.

5. A rocker arm bearing structure having separate ball assemblies spaced axially of the structure, said bearing structure including separate contacting inner ball bearing rings each provided with a ball race, one of said inner ball bearing rings having one or more outwardly extending lubricant conducting grooves in the face contacting with said other inner ball bearing ring.

6. A rocker arm bearing structure having separate ball assemblies spaced axially of the structure, said bearing structure including separate contacting inner ball bearing rings each provided with a ball race, the contacting faces of said inner ball bearing rings extending generally transverse to the axis of said bearing structure and provided with one or more outwardly extending lubricant conducting grooves.

7. A rocker arm bearing structure having separate ball assemblies spaced axially of the structure, said bearing structure including an outer ball bearing ring having axially spaced internal ball races accommodating said spaced ball assemblies, and separate contacting inner ball bearing rings each provided with an external ball race cooperating with one of said internal ball races carried by said outer ball bearing ring, one of said inner ball bearing rings having one or more outwardly extending lubricant conducting grooves in the face contacting with said other inner ball bearing ring.

ROBERT INSLEY.
ARCHIE M. NIVEN.